United States Patent [19]

Sandau

[11] 3,785,253
[45] Jan. 15, 1974

[54] RADIALLY YIELDING CYLINDER AND PISTON ARRANGEMENT

[75] Inventor: Hartmut Sandau, Moglingen, Germany

[73] Assignee: Robert Bosch GmbH, Stuttgart, Germany

[22] Filed: Jan. 14, 1972

[21] Appl. No.: 217,920

[30] Foreign Application Priority Data
Jan. 27, 1971 Germany .................. P 21 03 646.4

[52] U.S. Cl. ........................ 92/181, 92/244, 92/258
[51] Int. Cl. .......................... F16j 1/00, F16j 9/00
[58] Field of Search ..................... 92/181, 182, 184, 92/244, 251, 257, 258; 277/27, 70

[56] References Cited
UNITED STATES PATENTS

| 680,465 | 8/1901 | Reynolds | 92/258 |
|---|---|---|---|
| 1,988,726 | 1/1935 | Godron | 277/27 |
| 2,068,859 | 1/1937 | Jones et al. | 92/258 |
| 2,460,948 | 2/1949 | Sander | 92/258 |
| 3,207,426 | 9/1965 | Gassmann et al. | 277/27 |
| 3,247,767 | 4/1966 | Aslan | 92/258 X |

*Primary Examiner*—Irwin C. Cohen
*Attorney*—Michael S. Striker

[57] ABSTRACT

A piston structure, located in a cylinder to which pressure fluid can be supplied, includes a piston rod with a rigidly secured support piston on which a sealing piston, sliding in the cylinder, is mounted with radial play. The support piston is spaced from the cylinder surface and can move radially relative to the sealing piston and to the cylinder surface when the piston rod is radially displaced. Preferably, pressure areas balance the sealing piston in axial direction so that friction is reduced during relative radial movement between the support piston and the sealing piston due to radial displacement of the piston rod.

5 Claims, 3 Drawing Figures

RADIALLY YIELDING CYLINDER AND PISTON ARRANGEMENT

BACKGROUND OF THE INVENTION

The present invention relates to a cylinder and piston arrangement in which the piston structure includes a piston rod, and a piston means composed of several parts.

An arrangement of this type is disclosed in the U. S. Pat. No. 2,371,553 which has the disadvantage that the sealing piston with its sealing rings, is rigidly secured to the piston rod. In the event that the piston rod deviates even slightly from its correct position located in the axis of the cylinder, the sealing rings are compressed to compensate the relative displacement between the sealing piston and the cylinder surface. Such an arrangement requires a wide radial spacing of the piston means from the cylinder surface in order to prevent binding of the piston. The device may cause uneven pressures on the sealing rings, resulting in increased wear so that the sealing rings require service and exchange.

SUMMARY OF THE INVENTION

It is one object of the invention to overcome the disadvantages of known cylinder and piston arrangements, and to provide a radially yielding piston arrangement which reliably operates and consists of simple parts which can be inexpensively manufactured.

Another object of the invention is to provide a support piston which is radially movable with the piston rod without engaging the cylinder surface, and a sealing piston mounted with play on the support piston and sliding on the cylinder surface.

With these objects in view, the piston rod means of the invention is movable relative to a sealing piston in radial direction.

A cylinder and piston arrangement according to a preferred embodiment of the invention comprises a piston structure including a piston rod means located in a cylinder spaced from the inner surface of the same, and sealing piston means located in the cylinder means in sealing and sliding contact with the cylinder surface, and being mounted on the piston rod means for axial movement therewith, and radially spaced therefrom. Consequently, the piston rod means, which preferably includes the piston rod and a rigidly fixed support piston, is free to move in radial direction relative to the sealing piston means and the cylinder surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
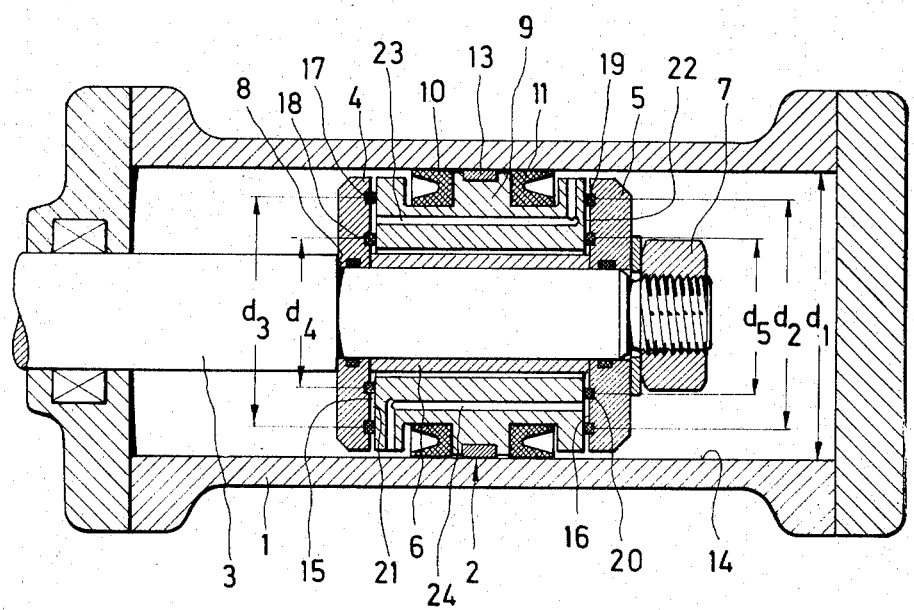
FIG. 1 is an axial sectional view illustrating a cylinder and piston arrangement according to one embodiment of the invention.

In the tubular cylinder 1 of a working cylinder means, a piston structure 2 is movable in axial direction, and may be operated by admitting pressure fluid to the chambers formed by the piston structure 2 in the cylinder means 1.

The piston structure 2 consists of several parts, including a piston rod 3 to which two disks 4 and 5 and an intermediate sleeve 6 are secured by a nut 7 on a threaded end portion of piston rod 3, nut 7 pressing the support piston 4, 5, 6 against a shoulder formed on piston rod 3. The support piston 4, 5, 6 is rigidly secured to piston rod 3 and moves with the piston rod in axial direction, and also in radial directions when piston rod 3 is displaced out of a central position in which its axis coincides with the axis of the cylinder surface 14, in which position the piston rod 3 is held by a bearing in an end member of the cylinder 1.

The peripheral rims of the disks 4 and 5 are radially spaced by circular gaps from the inner cylinder surface 14 so that a small radial displacement of piston rod 3 with disks 4 and 5 will not cause engagement of the peripheral rims of the disks 4 and 5 with the inner cylinder surface 14.

Between disks 4 and 5 of the support piston, an annular sealing piston 9 is mounted with ample axial play, and also surrounding the sleeve 6 with ample radial play. The sealing piston 9 has two sealing rings 10 and 11 surrounding its outer peripheral surface, and having lips opening in opposite directions toward the chambers which are located on opposite sides of the piston means in cylinder 2. Between the two sealing rings 10 and 11, a guide ring 13 surrounds the sealing piston 9 in a central location. Sealing rings 10 and 11, and guide ring 13 are in sliding and sealing contact with the inner cylinder surface 14, as required for axial movement of the piston structure 2 when pressure fluid is admitted to a pressure chamber on one side of the piston structure 2.

The confronting inner planar surfaces 15 and 16 of disks 4 and 5 are formed with circular grooves in which two sealing rings 17, 18 and 19, 20, respectively are mounted spaced from each other in radial direction, respectively, which are in sealing contact with lateral end faces of the sealing piston 9, and form on the same annular pressure areas 21 and 22, respectively. Each pressure area 21 and 22 is connected by a conduit 23 and 24, respectively, in the sealing piston 9 with the interior of the cylinder 1 by ports in sealing piston 9 located adjacent the disks 4 and 5, respectively. At the points where the ports of conduits 23 and 24 open, the distance between the clearing piston 9 and the inner cylinder surface 14 is substantial in radial direction.

FIG. 1 shows several lines provided with arrows to indicate diametrical distances and diameters. The diameter $d_2$ is equal to the diameters $d_3$, which are the diameters of the outer sealing rings 19 and 17. The diameter $d_4$ is equal to the diameters $d_5$, which is the diameter of the sealing rings 18 and 20. The diameter $d_1$ is equal to the diameter of the inner cylinder surface 14.

Assuming that pressure fluid has been introduced on the right side of piston structure 2 into cylinder 1, the disk 5 is under fluid pressure on an effective surface which is circular and has the diameter $d_2$ since the fluid pressure also acts on the opposite side of disk 5 on the effective annular surface having the inner diameter $d_2$. The respective force is directly transmitted from disk 5 to piston rod 3 to which disk 5 is rigidly secured by nut 7.

The force which acts on an annular surface on the right end face of sealing piston 9 having the diameter $d_1$ on the outside and the diameter $d_2$ on the inside, is compensated by the force produced by the pressure in the pressure area 21, which is connected by conduit 23 with the high pressure chamber of cylinder 1. Consequently, the sealing piston 9 is free of pressure and balanced, and has to overcome only the friction on the annular sealing rings 17 to 20 when the piston structure 2 makes a radial movement due to a radial movement of piston rod 3 deviating from its neutral correct position in which its axis coincides with the axis of the cylinder surface 14. Without the pressure relief conduits 33, 24 and the annular pressure areas 22, 21, the sealing piston 9 may not move in radial direction relative to the support piston 4, 5, 6, and to the cylinder surface 2, since the friction forces could be too great. When the piston structure 2 is moved in the other direction, corresponding pressure conditions take place, and the pressure equilibrium is obtained by the conduit 24 through which the pressure fluid flows into the pressure area 22.

Figure 2:
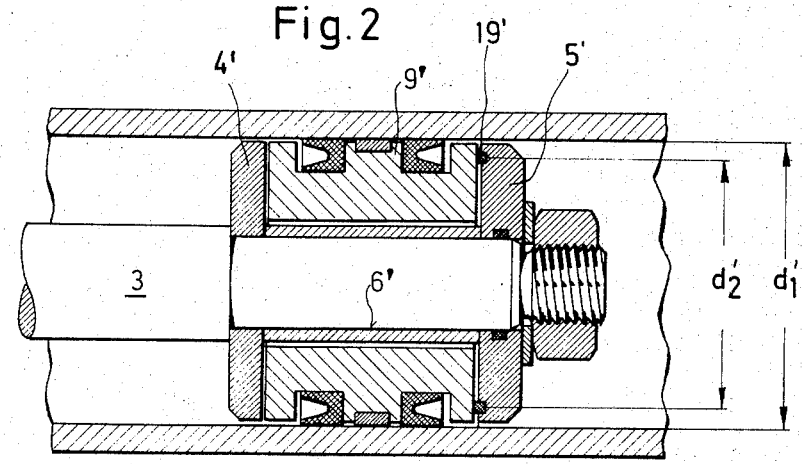
FIG. 2 is an axial sectional view illustrating a simplified modification of the embodiment of FIG. 1.

In the embodiment of FIG. 2, the support piston 4', 5', 6', is secured to the piston rod 3 as shown in FIG. 1, and a sealing piston 9' is mounted surrounding sleeve 6' and located between the disks 4' and 5'. The inner circular surface of sealing piston 9' is spaced by a radial gap from the outer cylindrical surface of sleeve 6', and also spaced in axial direction from the confronting lateral surfaces of the disks 4' and 5'. A sealing ring 19' is provided only on one side of the sealing piston 9' in a circular groove in the lateral surface of disk 5'.

The axial pressure which does not act on disk 5', is not compensated, as in the embodiment of FIG. 1, but if the diameter $d'_2$ is great, the difference in the function of the devices shown in FIGS. 1 and 2 is small. The simplified construction of FIG. 2 eliminates the axial conduits 23, 24, the smaller sealing ring 20, and both sealing rings 17 and 18.

Figure 3:
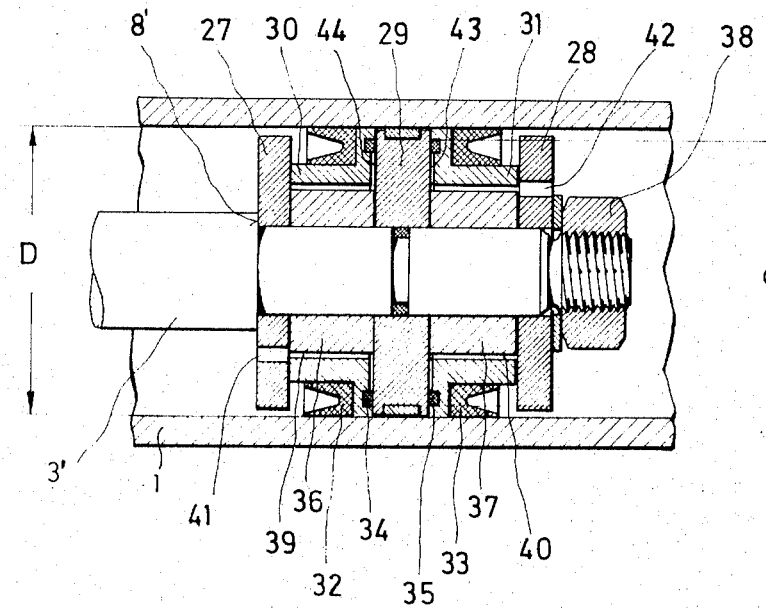
FIG. 3 is an axial sectional view illustrating another embodiment of the invention.

In the embodiment illustrated in FIG. 3, the support piston includes, in addition to the outer disks 27 and 28, also a central disk 29 which is equidistant from the outer disks 27 and 28. The three disks are spaced by circular sleeves 36 and 37, and all parts 27, 36, 29, 37, 28 are pressed against the annular shoulder 8' by nut 38.

Between disks 27 and 29, and also between disks 29 and 28, two sealing pistons 30 and 31, having angular cross-sections, are arranged surrounding the sleeves 36 and 37, and being surrounded by sealing rings 32 and 33 provided with outwardly opening lips. The confronting inner lateral surfaces of the sealing pistons 30 and 31 hold, in corresponding circular grooves, sealing rings 34 and 35. Sealing pistons 30 and 31 have ample radial play about the spacing sleeve 36 and 37, and also axial play in relation to the disks 27, 28, 29. Annular gaps 39 and 40 are located between the sealing pistons 30, 31 and the sleeves 36, 37. Openings or bores 41, 42 in disks 27 and 28, respectively, connect the annular gaps 39 and 40, respectively, with the respective correlated pressure chamber in the cylinder.

The outer diameter of the sealing rings 34, 35 is designated $d$, and the inner diameter of the cylinder 1 is designated D. Due to the pressure in the annular gaps 39, 40, a pressure area 44, 43, respectively, is built up, the pressure areas being limited by sealing rings 34 or 35.

Assuming that the pressure chamber in cylinder 1 on the right side of the piston structure 2' is filled with pressure fluid, the sealing piston 31 is balanced and the pressure relieved by the pressure area 43 which receives pressure fluid through the annular gap 40 and opening 42 in disk 28. Only a small force remains which is caused by the annular surface having the outer diameter D and the inner diameter d, and acting on the central disk 29, which is also rigidly secured to the piston rod 3' so that this small force is also transmitted in axial direction to the piston rod 3'.

The force produced by the pressure on the surface having the diameter d acting on the piston means, is partly taken up by disk 29, due to the pressure area 42, and partly directly transmitted to the piston rod 3'. Only a small force is required for displacing the sealing pistons 30, 31 in radial direction when the piston rod 3' is radially displaced, since the sealing pistons 30 and 31 are balanced, and the friction between the same and the disks 27, 28, 29 is reduced.

It will be understood that each of the elements described above, or two or more together, may also find a useful application in other types of cylinder and piston arrangements differing from the types described above.

While the invention has been illustrated and described as embodied in a radially yielding cylinder and piston arrangement having a support piston on which a sealing piston is mounted with radial play, and preferably balanced in axial direction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Radially yielding cylinder and piston arrangement, comprising a cylinder means having an inner surface; a piston rod; support piston means secured to said piston rod and located in said cylinder means, said support piston means including axially spaced disks having peripheral rims radially spaced from said inner surface; an annular sealing piston means surrounding with play the portion of said support piston means located between said disks and having lateral faces confronting said disks; plural sealing means between said lateral faces and said disks forming separate pressure areas, said sealing piston means having separate ducts connecting the pressure area adjacent each of said disks with the interior of said cylinder means adjacent the respective other disk so that said sealing piston means is balanced between said disks and relieved of axial pressure, said sealing piston means being spaced from said inner surface and having at least one peripheral recess; and annular sealing ring means in said recess having an outer surface in sliding contact with said inner surface so that said support piston means can radially move relative to said balanced sealing piston means and to said annular sealing ring means when said piston rod moves in radial direction.

2. An arrangement as claimed in claim 1, wherein said sealing means between said lateral faces and said disks include two concentric sealing rings on each disk, forming annular pressure areas, each annular pressure area being connected by the respective duct with a peripheral portion of said sealing piston means spaced from said inner surface.

3. An arrangement as claimed in claim 1 wherein said support piston means includes sleeve means surrounding a piston rod portion between said two disks, and being surrounded by said sealing piston means with radial play.

4. An arrangement as claimed in claim 1 wherein said sealing piston means includes a sealing piston, a central guide ring surrounding said sealing piston and sliding on said inner surface, and two axially spaced yieldable sealing rings on opposite sides of said guide ring sliding on said inner surface, and having sealing lips engaging said sealing piston means and said inner surface, respectively.

5. An arrangement as claimed in claim 1 wherein said piston rod has an annular shoulder and a threaded end portion, said support piston means mounting said sealing piston means and including sleeve means surrounding said piston rod, and nut means engaging said threaded end portion and pressing one of said disks against said shoulder so that said sleeve means and disks of said support piston means are rigidly secured to said piston means.

* * * * *